United States Patent
Wu et al.

(10) Patent No.: US 7,494,540 B2
(45) Date of Patent: Feb. 24, 2009

(54) SYSTEM FOR BONDING GLASS INTO A STRUCTURE

(75) Inventors: Ziyan Wu, Farmington Hills, MI (US); Harry W. Hsieh, Troy, MI (US); Daniel P. Heberer, Rochester Hills, MI (US); Dominic J. Allam, Canton, MI (US)

(73) Assignee: Dow Global Technologies, Inc., Midland, MI (US)

( * ) Notice: Subject to any disclaimer, the term of this patent is extended or adjusted under 35 U.S.C. 154(b) by 818 days.

(21) Appl. No.: 11/012,606

(22) Filed: Dec. 15, 2004

(65) Prior Publication Data

US 2006/0124225 A1    Jun. 15, 2006

(51) Int. Cl.
  *C09J 5/02*    (2006.01)
  *C09J 175/00*  (2006.01)
(52) U.S. Cl. .................. 106/287.11; 524/188; 156/108; 156/314; 156/315
(58) Field of Classification Search ............... 106/287.1; 156/329
   See application file for complete search history.

(56) References Cited

U.S. PATENT DOCUMENTS

| | | |
|---|---|---|
| 3,152,162 A | 10/1964 | Fischer et al. |
| 3,459,584 A | 8/1969 | Caldwell |
| 3,502,704 A | 3/1970 | McKellar |
| 3,627,722 A | 12/1971 | Seiter |
| 3,707,521 A | 12/1972 | De Santis |
| 3,772,122 A | 11/1973 | Young |
| 3,779,794 A | 12/1973 | De Santis |
| 3,864,135 A | 2/1975 | Kuehn |
| 3,886,226 A | 5/1975 | Asai et al. |
| 3,971,751 A | 7/1976 | Isayama et al. |
| 3,979,344 A | 9/1976 | Bryant et al. |
| 4,020,049 A | 4/1977 | Rinehart |
| 4,222,925 A | 9/1980 | Bryant et al. |
| 4,224,376 A | 9/1980 | Ishige et al. |
| 4,284,751 A | 8/1981 | Hutt et al. |
| 4,302,571 A | 11/1981 | Arai et al. |
| 4,345,053 A | 8/1982 | Rizk et al. |
| 4,367,313 A | 1/1983 | Rizk et al. |
| 4,374,237 A | 2/1983 | Berger et al. |
| 4,396,681 A | 8/1983 | Rizk et al. |
| 4,399,261 A | 8/1983 | Kato et al. |
| 4,418,188 A | 11/1983 | Smith et al. |
| 4,419,513 A | 12/1983 | Breidenbach et al. |
| 4,444,974 A | 4/1984 | Takase et al. |
| 4,474,933 A | 10/1984 | Huber et al. |
| 4,507,469 A | 3/1985 | Mita et al. |
| 4,511,626 A | 4/1985 | Schumacher |
| 4,525,511 A | 6/1985 | Kirby et al. |
| 4,539,345 A | 9/1985 | Hansen |
| 4,555,561 A | 11/1985 | Sugimori et al. |
| 4,567,228 A | 1/1986 | Gaa et al. |
| 4,571,278 A | 2/1986 | Kunert |
| 4,582,873 A | 4/1986 | Gaa et al. |
| 4,618,656 A | 10/1986 | Kawakubo et al. |
| 4,622,369 A | 11/1986 | Chang et al. |
| 4,623,738 A | 11/1986 | Sugerman et al. |
| 4,624,012 A | 11/1986 | Lin et al. |
| 4,625,012 A | 11/1986 | Rizk et al. |
| 4,640,969 A | 2/1987 | Goel et al. |
| 4,643,794 A | 2/1987 | Saracsan et al. |
| 4,645,816 A | 2/1987 | Pohl et al. |
| 4,650,835 A | 3/1987 | Eck et al. |
| 4,681,926 A | 7/1987 | Goel |
| 4,687,533 A | 8/1987 | Rizk et al. |
| 4,720,536 A | 1/1988 | House et al. |
| 4,758,648 A | 7/1988 | Rizk et al. |
| 4,780,520 A | 10/1988 | Rizk et al. |
| 4,788,170 A | 11/1988 | Wengrovius |
| 4,788,254 A | 11/1988 | Kawakubo et al. |
| 4,837,274 A | 6/1989 | Kawakubo et al. |
| 4,837,401 A | 6/1989 | Hirose et al. |
| 4,889,903 A | 12/1989 | Baghdachi |

(Continued)

FOREIGN PATENT DOCUMENTS

CA    2560989    10/2005

(Continued)

OTHER PUBLICATIONS

Petrie, Edward M. Handbook of Adhesives and Sealants. 2000. McGraw-Hill. pp. 277.*

(Continued)

*Primary Examiner*—Jennifer McNeil
*Assistant Examiner*—Sarah Van Oudenaren
(74) *Attorney, Agent, or Firm*—Norman L. Sims

(57) ABSTRACT

The invention is a composition comprising a) one or more organotitanates or zirconates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure with the proviso that one of the ligands has an acidic moiety; one or more strong organic acids or a mixture thereof; b) one or more alkoxysilanes; c) optionally one or more high molecular weight resins; and d) a solvent which dissolves the components of the composition. This composition is referred to as a clear primer hereinafter. Preferably, the composition comprises both an organotitanate or zirconate and a strong acid.

17 Claims, No Drawings

U.S. PATENT DOCUMENTS

| | | |
|---|---|---|
| 4,906,707 A | 3/1990 | Yukimoto et al. |
| 4,954,598 A | 9/1990 | Baghdachi et al. |
| 4,963,614 A | 10/1990 | Ito et al. |
| 4,963,636 A | 10/1990 | Mülhaupt et al. |
| 4,965,311 A | 10/1990 | Hirose et al. |
| 4,977,228 A | 12/1990 | Wakabayashi et al. |
| 5,011,900 A | 4/1991 | Yukimoto et al. |
| 5,063,269 A | 11/1991 | Hung |
| 5,063,270 A | 11/1991 | Yukimoto et al. |
| 5,068,304 A | 11/1991 | Higuchi et al. |
| 5,086,151 A | 2/1992 | Ito et al. |
| 5,097,053 A | 3/1992 | Baghdachi et al. |
| 5,110,892 A | 5/1992 | Graham |
| 5,115,086 A | 5/1992 | Hsieh |
| 5,147,927 A | 9/1992 | Baghdachi et al. |
| 5,194,460 A | 3/1993 | Evans et al. |
| 5,206,200 A | 4/1993 | Bush et al. |
| 5,223,583 A | 6/1993 | Higuchi et al. |
| 5,223,597 A | 6/1993 | Iwakiri et al. |
| 5,272,224 A | 12/1993 | Baghdachi et al. |
| 5,288,839 A | 2/1994 | Greco |
| 5,302,303 A | 4/1994 | Clatty et al. |
| 5,330,597 A | 7/1994 | Leuchten et al. |
| 5,342,867 A | 8/1994 | Ryan et al. |
| 5,342,914 A | 8/1994 | Iwakiri et al. |
| 5,363,944 A | 11/1994 | Thiel et al. |
| 5,370,905 A | 12/1994 | Varga et al. |
| 5,403,881 A | 4/1995 | Okawa et al. |
| 5,409,961 A | 4/1995 | Green |
| 5,409,995 A | 4/1995 | Iwahara et al. |
| 5,476,889 A | 12/1995 | Owen |
| 5,489,618 A | 2/1996 | Gerkin |
| 5,500,464 A | 3/1996 | Homma et al. |
| 5,539,045 A | 7/1996 | Potts et al. |
| 5,541,266 A | 7/1996 | Hasegawa et al. |
| 5,554,686 A | 9/1996 | Frisch et al. |
| 5,554,709 A | 9/1996 | Emmerling et al. |
| 5,567,833 A | 10/1996 | Iwahara et al. |
| 5,603,798 A | 2/1997 | Chiao |
| 5,623,044 A | 4/1997 | Chiao |
| 5,650,467 A | 7/1997 | Suzuki |
| 5,672,652 A | 9/1997 | Bhat |
| 5,741,383 A | 4/1998 | Kneisel |
| 5,744,543 A | 4/1998 | Huver et al. |
| 5,852,137 A | 12/1998 | Hsieh et al. |
| 5,910,555 A | 6/1999 | Ueda et al. |
| 5,922,809 A | 7/1999 | Bhat et al. |
| 5,952,052 A | 9/1999 | Hattori et al. |
| 5,976,305 A | 11/1999 | Bhat et al. |
| 6,025,416 A | 2/2000 | Proebster et al. |
| 6,255,434 B1 | 7/2001 | McGraw et al. |
| 6,319,344 B1 | 11/2001 | Lewno |
| 6,391,465 B1 | 5/2002 | Zheng et al. |
| 6,511,752 B1 | 1/2003 | Yao et al. |
| 6,512,033 B1 | 1/2003 | Wu |
| 6,605,666 B1 * | 8/2003 | Scholz et al. ............... 524/591 |
| 6,649,016 B2 | 11/2003 | Wu et al. |
| 2003/0098114 A1 * | 5/2003 | Samurkas et al. ........... 156/108 |
| 2003/0173026 A1 | 9/2003 | Wu et al. |
| 2003/0232152 A1 | 12/2003 | Allam et al. |
| 2005/0126253 A1 | 6/2005 | Hsieh et al. |
| 2006/0124225 A1 | 6/2006 | Wu et al. |
| 2006/0287408 A1 | 12/2006 | Baikerikar et al. |
| 2008/0199607 A1 | 8/2008 | Hsieh et al. |

FOREIGN PATENT DOCUMENTS

| | | |
|---|---|---|
| EP | 0158893 | 10/1985 |
| EP | 0082528 | 4/1986 |
| EP | 0070475 | 10/1986 |
| EP | 0363006 | 4/1990 |
| EP | 0546310 A2 | 6/1993 |
| EP | 0450105 | 11/1995 |
| EP | 0819749 A2 | 1/1998 |
| EP | 0532048 | 8/1998 |
| EP | 0533275 B1 | 12/1998 |
| EP | 0538880 | 3/1999 |
| EP | 0525769 | 9/1999 |
| EP | 0856569 B1 | 6/2002 |
| WO | WO98/18843 | 5/1998 |
| WO | WO99/55755 | 11/1999 |
| WO | WO99/55794 | 11/1999 |
| WO | WO03/19745 A1 | 3/2003 |
| WO | WO03/106579 A1 | 12/2003 |

OTHER PUBLICATIONS

What is Kaneka MS Polymer and Kaneka Silyl?; Kaneka Corporation, Tokyo 107, Japan, pp. 1-15.

Shayne J. Landon et al., Double-Liaison-Phys., Chim. Econ. Peint. Adhes, The Adhesion of Hybrid Sealants to Plastic Substrates, 1997 44(500), pp. 32-36, Tarrytown, NY.

Dr. Ir. Richard Oosting, "Opportunities to Reduce Environmental Problems Together with a Reduction of the Manufacturing Costs", MS-Polymertechnologie: MS Polymer Technology, Simson B.V., No Date Available.

Dover Chemical Corporation, Doverphos 7, 12, 675, Tetrakis Isodecyl 4,4'Isopropylidene Diphosphite, Dover Ohio, No Date Available.

Fomrez® Tin Catalysts, Using Silane Crosslinked Technology, Witco Corporation, Greenwich, CT, pp. 1-4.

Chemical Abstract, 98:162252j. Moisture-Curable Silicone Rubber Compositions, Kanegafuchi Chemical Industry, vol. 98, 1983.

Chemical Abstract, 101:231637h, Pressure-Sensitive Adhesive Tapes, Kanegafuchi Chemical Industry Co. Ltd., vol. 101, 1984.

Chemical Abstract, 103:72706c, Curable Compositions, Sango Chemical Industries, vol. 103, 1985.

Chemical Abstract, 103:125207z, Vulcanizable Sealant Compositions, vol. 103, 1985, Bryant et al.

Chemical Abstract, 104:225770s, Moisture-Curable Compositions. vol. 104, 1986, Katsuno.

Chemical Abstract, 104:90652g, Silane-Containing Isocyanate Prepolymers, vol. 104, 1986, Chow et al.

Chemical Abstract, 109:94444s, Adhesives for Automobile Side Molding Strips, vol. 109, 1988, Yamagishi et al.

Chemical Abstract, 111:99087d, Anticorrosive and Antisoiling Nitrogen-Containing Vinyl Polymer Coatings for Galvanized Steel of Paved Roads, vol. 111, 1989, Masuda et al.

Chemical Abstract, 111:234606q (unavailable), Naoki et al. claims for Patent No. 234606 is included, vol. 111, 1989.

Chemical Abstract, 116:130726r, Moisture-Curable, Primerless Polyurethane Sealants for Glass Panels, vol. 116, 1992, Baghdachi et al.

Chemical Abstract, 118:104580k, Curable Hydrolyzable Group-Containing Polyoxypropylene Compositions, vol. 118, 1993, Fujita et al.

Chemical Abstract, 121:135901g, Room-Temperature-Curable Compositions, vol. 121, 1994, Toda et al.

Chemical Abstract, 123:58499u, Moisture-Curable Compositions, vol. 123, 1995, Yamamoto et al.

Chemical Abstract, 123:114600j, Moisture-Curable Resin Compositions, vol. 123, 1995, Yamaguchi.

Chemical Abstract 123:171406z, Room-Temperature-Curable Adhesives Containing Alkoxysilyl-Terminated Polyoxyalkiylene Derivatives, INOE, vol. 123, 1995.

Chemical Abstract, 123:288410n, Curable Compositions for Cured Products with Good Mechanical Properties and Adhesion Strength for Sealants and Adhesives, vol. 123, 1995.

Chemical Abstract, 123:259569r, Room-Temperature-Curable Polyether Compositions for Sealants and Adhesives, vol. 123, 1995, Higuchi et al.

Chemical Abstract, 124:203936m, Curable Resin Compositions with Adhesive Durability, Useful for Sealing Materials, etc, vol. 124, No. 16, 1996, Higuchi et al.

Chemical Abstract, 124:31204c, Curable Polymer Compositions, vol. 124, No. 4, 1996, Higuchi et al.

Chemical Abstract, 125:12432e, Curable Silyl-Containing Polyether Compositions with Improved Adhesion Strength and Mechanical Properties, vol. 125, No. 2, 1996, Higuchi et al.

Chemical Abstract 125:331084q, Polyoxyalkylene-Silicone Rubber Sealing and Adhesive Compositions Curable by Moisture at Room Temperature, vol. 125, No. 26, 1996, Murayama et al.

Chemical Abstract 126:32180v, Manufacture of Moisture-Curable Polyurethane Compositions Containing Hydrolyzable Silyl Group Containing Compounds and Curable Compositions Therefrom, vol. 126, No. 3, 1997.

Chemical Abstract, 127:34958z. Hardenable Compositions of Reactive Silyl-Substituted Polyoxyalkylenes and Epoxy Resins Applicable by Spraying, vol. 127, No. 3, 1997, Yukimitsu et al.

Chemical Abstract, 127:18588y, Hydrolyzable Silyl-Terminated Propylene Oxide Polymer Compositions Curable by Moisture at Room Temperature and Giving Delustered Cured Products, vol. 127, No. 2, 1997, Murayama et al.

Chemical Abstract, 127:96052h, Moisture Fast Curable Silicone Resin Composition, vol. 128, , 127, No. 7, 1997, Yotsuyanagi.

Chemical Abstract, 127:332526p, Curing Compositions with Improved Adhesion Strength, vol. 127, No. 24, 1997, Murohashi et al.

Chemical Abstract, 127:34736k, Ultraviolet-Curing Adhesive Compositions for Optical Disks and Article, vol. 127, No. 25, 1997, Tokuda et al.

Chemical Abstract, 129:96480n, Compression-Elastic Foamable Material Based on Silane-Modified Polymer, vol. 129, Proebster et al., vol. 129 No. 8.

Chemical Abstract, 129:317333w, Silyl-Modified Polymer Compositions for Storage-Stable Curable Adhesives, vol. 129, No. 24, 1998, Shiyangi et al.

Chemical Abstract, 130:111312a, Single-Component Compositions with Reactive System Containing Moisture-Hardenable, Alkoxysilane-Terminated Polyurethanes and their Manufacture and use, vol. 130, No. 9, 1999, Emmerling et al.

Chemical Abstract, 131:338014z, Cure on Demand Adhesives and Window Module Using Cure on Demand Adhesive, vol. 131, No. 25, 1999, Mahdi et al.

Derwent JP 53092857, Furukawa Electric Co. Ltd., 1978.

Derwent 92-425079/52, DE4119484-A, Teroson GmbH, Proebster.

Derwent 94-279700, WO 9418255, Essex Specialty, Buchholz et al.

Derwent 95-041548/06, JP 06322351-A, Sekisui Chem. Ind. Co. Ltd.

Derwent 98-551255/47, JP 10245482-A, Konishi Co. Ltd.

Derwent 99-287967/24, WO9919405-A1, Kaneka Corporation, Yamaguchi et al.

Derwent 99-210989/18, JP 11049970-A, Asahi Glass Co. Ltd.

English Abstract, JP05043643A, Feb. 23, 1993, Granulating Agent for Rubber Powder, and Molding and Pavement Structure Prepared Therefrom, Susumu Takahashi et al.

English Abstract, JP05170857A, Jul. 9, 1993, Preparation of Urethane Prepolymer Excellent in Thermal Stability, Hiroshi Suzuki et al.

English Abstract, JP 02036260A, Shinetsu Chem. Ind. Co. Ltd., Jul. 26, 1988.

Hsieh et al., U.S. Case 63063B, filed Dec. 10, 2004, Application Serial No. 11/008,426.

The adhesion of hybrid sealants to plastic substrates. Double Liaison—Physique, Chimie&Economie des Peintures&Adhesifs (1998), 44, (500), 32-36. Publisher: (IDEXPO, ) CODEN:DLPAEL ISSN:1166-4398.

MS-Polymer Technology Opportunities to reduce environmental problems together with a reduction of the manufacturing cost: Proceedings of Eleventh Symposium Swiss Bonding Conference, Held on May 26-28, 1997, in Zurich, Switzerland.

Chemical Abstract, 98:162252j, Moisture- Curable Silicone Rubber Compositions, Kanegafuchi Chemical Industry, vol. 98, 1983, Jpn. Kokai Tokkyo Koho Jp 57, 182,350 [82, 182,350].

Chemical Abstract, 101:231637h, Pressure-Sensitive Adhesive Tapes, Kanegafuchi Chemical Industry Co. Ltd., vol. 101, 1984, Jpn. Kokai Tokkyo Koho JP 59,120,672 [84, 120,672].

Chemical Abstract, 103:72706c, Curable Compositions, Sango Chemical Industries, vol. 103, 1985, Jpn. Kokai, Tokkyo Koho JP 60 44,549 [85 44,549].

Chemical Abstract, 103:125207z, Vulcanizable Sealant Compositions, vol. 103, 1985, Bryant et al., Pat. Specif. (Aust. ) AU 542,856, Inmont Corporation.

Chemical Abstract, 104:225770s, Moisture-Curable Compositions, vol. 104, 1986, Katsuno, Jpn. Kokai Tokkyo Koho JP 60,215,058 [85,215,058], Three Bond Co., Ltd.

Chemical Abstract, 104:90652g, Silane-Containing Isocyanate Prepolymers, vol. 104, 1986, Chow et al. , Union Carbide Corporation, Eur. Pat. Appl. EP 158,893.

Chemical Abstract, 109:9444s, Adhesives for Automobile Side Molding Strips, vol. 109, 1988, Yamagishi et al., Fuji Heavy Industries Ltd.; Sunrise Meisei Corporation, Jpn. Kokai Tokkyo Koho JP 63 97,674 [88 97,674].

Chemical Abstract, 111:234606q Naoki et al., vol. 111, 1989; Cemedine Co. Ltd., Jpn. Kokai Tokkyo Koho JP 01 45,486 [89 45,486], One-Component Rapid-Setting Siloxane Adhesives for Assembly of Speakers.

Chemical Abstract, 111:99087d, Anticorrosive and Antisoiling Nitrogen-Containing Vinyl Polymer Coatings for Galvanized Steel of Paved Roads, vol. 111, 1989, Masuda et al., Dainippon Ink and Chemicals, Sumikin Kozai Kogyo Co., Ltd., Jpn. Kokai Tokkyo Koho JP 63,275,674 [88,275,674].

Chemical Abstract, 116:130726r, Moisture-Curable, Primerless Polyurethane Sealants for Glass Panels, vol. 116, 1992, Baghdachi et al., BASF Corporation, Eur. Pat. Appl. EP 450,105.

Chemical Abstract, 118:104580k, Curable Hydrolyzable Group-Containing Polyoxypropylene Compositions, vol. 118, 1993, Fujita et al., Kanegafuchi Chemical Industry Co., Ltd., Jpn. Kokai Tokkyo Koho JP 04,283,259 [92,283,259].

Chemical Abstract, 121:135901g, Room-Temperature-Curable Compositions, vol. 121, 1994, Toda et al., Sekisui Chemical Co. Ltd., Jpn. Kokai Tokkyo Koho JP 06 16,921 [94 16,921].

Chemical Abstract, 123:58499u, Moisture-Curable Compositions, vol. 123, 1995, Yamamoto et al., Asahi Glass Co. Ltd., Jpn. Kokai Tokkyo Koho JP 06,340,819 [94,340,819].

Chemical Abstract, 123:114600j, Moisture-Curable Resin Compositions, vol. 123, 1995, Yamaguchi, Yokohama Rubber Co. Ltd., Jpn., Kokai Tokkyo Koho JP 07 11,155 [95 11,155].

Chemical Abstract 123:171406z, Room-Temperature-Curable Adhesives Containing Alkoxysilyl-Terminated Polyoxyalkylene Derivatives, INOE, vol. 123, 1995, Shinetsu Chem Ind Co., Jpn. Kokai Tokkyo Koho JP 0718,171 [95 18,171].

Chemical Abstract 123:259569r, Room-Temperature-Curable Polyether Compositions for Sealants and Adhesives, vol. 123, 1995, Higuchi et al., Asahi Glass Co. Ltd., Jpn. Kokai Tokkyo Koho JP 0790, 168 [95 90,168].

Chemical Abstract, 123:288410n, Curable Compositions for Cured Products with Good Mechanical Properties and Adhesion Strength for Sealants and Adhesives, vol. 123, 1995, Asahi Glass Co. Ltd., Jpn. Kokai Tokkyo Koho JP 07, 149,875 [95,149,875].

Chemical Abstract, 124:203936m, Curable Resin Compositions with Adhesive Durability, Useful for Sealing Materials, etc, vol. 124, No. 16, 1996, Higuchi et al., Asahi Glass Co. Ltd. ,Japan, Jpn. Kokai Tokkyo Koho JP 07,331,093 [95,331,093].

Chemical Abstract, 124:31204c, Curable Polymer Compositions, vol. 124, No. 4, 1996, Higuchi et al., Asahi Glass Co. Ltd., Jpn. Kokai Tokkyo Koho JP 07,196,891 [95,196,891].

Chemical Abstract, 125:12432e, Curable Silyl-Containing Polyether Compositions with Improved Adhesion Strength and Mechanical Properties, vol. 125, No. 2, 1996, Higuchi et al., Asahi Glass Co., Ltd., Japan, Jpn. Kokai Tokkyo Koho JP 0859,961 [96 59,961].

Chemical Abstract 125:331084q, Polyoxyalkylene-Silicone Rubber Sealing and Adhesive Compositions Curable by Moisture at Room Temperature, vol. 125, No. 26, 1996, Murayama et al., Sekisui Chemical Co. Ltd., Japan, Jpn. Kokai Tokkyo Koho JP 08,225,707 [96,225,707].

Chemical Abstract 126:32180v, Manufacture of Moisture-Curable Polyurethane Compositions Containing Hydrolyzable Silyl Group Containing Compounds and Curable Compositions Therefrom, vol.

126, No. 3, 1997, Dainippon Ink & Chemicals, Japan, Jpn. Kokai Tokkyo Koho JP 08,253,545 [96,253,545], Matsumoto.

Chemical Abstract, 127:34958z, Hardenable Compositions of Reactive Silyl-Substituted Polyoxyalkylenes and Epoxy Resins Applicable by Spraying, vol. 127, No. 3, 1997, Yukimitsu et al., Kanegafuchi Chemical Industry Co., Ltd., Japan, Jpn. Kokai Tokkyo Koho JP 09,100,340 [97,100,340].

Chemical Abstract, 127:18588y, Hydrolyzable Silyl-Terminated Propylene Oxide Polymer Compositions Curable by Moisture at Room Temperature and Giving Delustered Cured Products, vol. 127, No. 2, 1997, Murayama et al., Sekisui Chemical Co. Ltd., Japan, Jpn. Kokai Tokkyo Koho JP09,100,408 [97,100,408].

Chemical Abstract, 127:96052h, Moisture Fast Curable Silicone Resin Composition, vol. 128, 127, No. 7, 1997, Yotsuyanagi, Konishi K.K., Japan, Jpn. Kokai Tokkyo Koho JP 09,143,360 [97,143,360].

Chemical Abstract, 127:332526p, Curing Compositions with Improved Adhesion Strength, vol. 127, No. 24, 1997, Murohashi et al., Asahi Glass Co., Ltd., Japan, Jpn. Kokai Tokkyo Koho JP 09,255,881 [97,255,881].

Chemical Abstract, 127:347136k, Ultraviolet-Curing Adhesive Compositions for Optical Disks and Article, vol. 127, No. 25, 1997, Tokuda et al., Nippon Kayaku Kabushiki Kaisha; Tokuda, Kiyohisa; Yoshida, Kenji; Ishii, Kazuhiko; Yokoshima, Minoru, Japan, PCT Int. Appl. WO 97 40, 115.

Chemical Abstract, 129:96480n, Compression-Elastic Foamable Material Based on Silane-Modified Polymer, Proebster et al., vol. 129, No. 8, 1988, Henkel Teroson GmbH, Germany, Ger. Offen DE 19,653,388.

Chemical Abstract, 129:317333w, Silyl-Modified Polymer Compositions for Storage-Stable Curable Adhesives, vol. 129, No. 24, 1998, Shiyanagi et al., Konishi K.K. Japan, Jpn. Kokai Tokkyo Koho JP 10 251,552 [98 251,552].

Chemical Abstract, 130:111312a, Single-Component Compositions with Reactive System Containing Moisture-Hardenable, Alkoxysilane-Terminated Polyurethanes and their Manufacture and use, vol. 130, No. 9, 1999, Emmerling et al., Henkel K-GaA, Germany, Ger. Offen DE 19,727,029.

Chemical Abstract, 131:338014z, Cure on Demand Adhesives and Window Module Using Cure on Demand Adhesive, vol. 131, No. 25, 1999, Mahdi et al., The Dow Chemical Company; Essex Specialty Products, Inc., USA, PCT Int. Appl. WO 99 55,794.

Database WPI, Section Ch, Week, 198933, Derwent Publications, Ltd., London, GB; Class A25, AN 1989-238948, XP002325258 & JP 01174571A Yokohohama Rubber Co. Ltd., Jul. 11, 1989 abstract.

JP2036260A; 19900206, Room Temperature Curing Composition, Abstract, JP18657588A, Shinetsu Chemical Company.

JP53092857A, AN1978-67653A, Crosslinked Modified Polyolefin Moulding Compsn, Furukawa Electric Co. Ltd., Abstract.

Shayne J. Landon et al., J. Adhes, Sealant Counc., The Adhesion of Hybrid Sealants to Plastic Substrates, 1996 (Nov., vol. 1) pp. 21-36.

* cited by examiner

SYSTEM FOR BONDING GLASS INTO A STRUCTURE

FIELD OF INVENTION

The invention relates to compositions used to prepare glass or coated plastic for bonding to a polyurethane adhesive. In another embodiment, the invention relates to systems comprising a composition used to prepare glass or coated plastic for bonding to polyurethane adhesives and the polyurethane adhesives. The invention further relates to a method of bonding glass or coated plastic into a structure, such as a building or an automobile, using the system of the invention.

BACKGROUND OF INVENTION

Glass installation is typically a three-stage process. First, a clear silane primer or cleaner is applied to the glass to clean and prepare the surface for bonding. Second, a primer, which is essentially a carbon black dispersion which also contains a compound having silane and/or isocyanate functionality, often referred to as "black-out primer", is then applied over the top of the clear primer. Third, an adhesive is applied to the primed glass which is then installed into the structure. See, U.S. Pat. No. 5,370,905, incorporated herein by reference. The black-out primer can mar surfaces of a structure or vehicle onto which the black-out primer may be dripped during installation. U.S. Pat. No. 5,363,944 discloses a single-step primer system. The primer comprises an aqueous primer solution containing a silane coupling agent which is used to facilitate adhesion of a polymer to a non-porous inorganic substrate such as metal or glass. The silane coupling agent has an amino or a mercaptosilane functional group which is capable of reacting with functional groups of the polymer and also has one or more hydrolyzable groups which react with the free-hydroxyl groups on the surface of the substrate. This system requires long dry times before an adhesive can be applied. For many commercial operations, such long dry times are unacceptable. This is especially true in automotive assembly plants wherein each operation needs to be completed in a short period of time.

Yao et al., U.S. Pat. No. 6,511,752 discloses the method for adhering a polyurethane based sealant or adhesive to a substrate which comprises applying an aqueous primer solution onto the substrate which comprises water, an amino titanate compound, and preferably, an epoxy silane having at least one epoxy group and at least two alkoxy groups. Thereafter, a polyurethane adhesive is applied to the primer treated surface. A reaction product is formed between the primer and polyurethane.

In order for a primer and adhesive system to be commercially viable, the system must provide a durable bond. "Durable bond" means that the adhesive holds the window into the structure for a period of years. As the structure to which window glass is traditionally bonded lasts for a significant number of years, it is expected that the bond holding the glass into a structure also lasts a significant number of years. What is needed is a system which bonds glass or coated plastic into a structure which does not require black-out primer, which provides durable adhesion and which does not require long dry times between application of the primer and application of the adhesive. What is further needed is a system which allows for durable adhesion of the adhesives to the substrate surface.

SUMMARY OF INVENTION

The invention is a composition comprising a) one or more organotitanates or organozirconates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure with the proviso that one of the ligands has an acidic moiety; one or more strong organic acids or a mixture thereof; b) one or more alkoxysilanes; c) optionally one or more high molecular weight resins; and d) a solvent which dissolves the components of the composition. This composition is referred to as a clear primer hereinafter. Preferably, the composition comprises both an organotitanate or organozirconate and a strong acid.

In another embodiment the invention is a system for bonding glass or a coated plastic to a substrate which comprises a clear primer according to the invention; and an adhesive comprising an isocyanate functional prepolymer and a catalyst for the cure of the isocyanate functional prepolymer.

In another embodiment the invention is a method comprising

A) applying a clear primer according to the invention to the surface of glass or coated plastic, coated with an abrasion resistant coating, along the portion of the glass or coated plastic to be bonded into a structure;

B) applying a polyisocyanate functional adhesive composition to the surface of the glass or coated plastic along the portion of the glass or coated plastic to be bonded into the structure to which the clear primer was previously applied; and C) contacting the glass or coated plastic with the structure with the adhesive disposed between the glass or coated plastic and the structure. Preferably, the glass or coated plastic is adapted to be used as a window.

The invention also comprises a structure having a window bonded to it using a clear primer of the invention and preferably, a polyisocyanate functional adhesive composition. Preferably such structure is a building or an automobile. The invention provides a clear primer system and bonding system which bonds glass or coated plastic into a structure without the need for a black-out primer. The system provides durable adhesion to the substrate. The clear primer drys rapidly allowing for application of the adhesive to the treated surface, in a short of period of time after the application of a clear primer. This system meets with the timing needs of an automobile assembly plant. The compositions and systems of the invention work well on a variety of ceramic enamels deposited on glass and on coated plastic having an opaque coating deposited on a portion thereof. In particular, they work on press bent and sag bent glass.

DETAILED DESCRIPTION OF INVENTION

In one aspect, the invention is a composition useful as a clear primer. This composition comprises one or more organotitanates, organozirconates, strong acids or mixtures thereof; one or more alkoxysilanes; optionally, one or higher molecular weight resins and a solvent which dissolves the components of the composition. One component of this composition is one or more organotitanates, one or more organozirconates or a mixture thereof wherein the organotitanates and/or organozirconates have four ligands wherein the ligands are hydrocarbyl, optionally containing one or more functional groups having one or more heteroatoms selected from the group comprising oxygen, nitrogen, phosphorus and sulfur. Any two or more of the ligands may be bonded together to form a cyclic ring structure. The cyclic ring structure can contain one or more heteroatoms or heteroatom containing functional groups. The organotitanates and organozirconates have at least one ligand which has acidic functionality. Acidic functionality as used in this context means the ligand contains a moiety which is a Bronsted acid. Preferred moieties which provide acidic functionality to the ligands are carboxyl, sulfonyl and phosphonyl moieties. More preferred acidic moieties contained in the ligands are sulfonyl and phosphonyl moieties. Any organotitanate or organozirconates having such ligands which enhances the formation of a durable adhesive bond between an isocyanate functional adhesive and a glass or coated plastic surface may be used. Preferably, the ligands on the titanate or zirconate are selected from the group comprising hydrocarbyl, hydrocarbyl carboxyl, hydrocarbyl sulfonyl, phosphatohydrocarbyl, pyrophosphatohydrocarbyl or a mixture thereof. Two or more ligands may form a hydrocarbylene moiety or a carboxyl containing hydrocarbylene moiety. In a more preferred embodiment, the ligands are alkyl, alkenyl, alkylcarboxyl, alkenyl carboxyl, aryl or aralkylsulfonyl, phosphato-alkyl, pyrophosphato-alkyl, alkylene or carboxylalkylene or a mixture thereof. As used herein, "hydrocarbyl" means a monovalent moiety comprising hydrogen and carbon atoms. Hydrocarbylene means a polyvalent hydrogen and carbon containing moiety. The term "optionally containing heteroatom" means that the recited ligand may contain one or more heteroatoms such as nitrogen, sulfur, oxygen or phosphorus. "Alkenyl" means a straight or branched hydrocarbon chain having at least one double bond therein. "Alkyl" means a straight or branched saturated hydrocarbon chain. "Alkylene" means a straight or branched saturated polyvalent hydrocarbon chain. "Aryl" means an aromatic hydrocarbon containing ligand, such as phenyl, biphenyl or naphthyl. "Alkaryl" means a ligand which contains both aliphatic and aromatic structural components; for example, 1,3 propylene diphenyl or nonylphenyl. Arylene as used herein refers to a polyvalent group which comprises aromatic rings such as phenylene, naphthalene or biphenylene. Alkarylene means a divalent group which has both aliphatic and aromatic structural components; i.e., such as 1,3 propylene diphenylene or methylene diphenylene.

The organotitanate or organozirconate preferably exhibits a pH of 4.0 or less, more preferably 3.0 or less and most preferably 2.0 or less. The organotitanates are preferred over the organozirconates.

Preferably, the titanates and zirconates used in the invention correspond to Formula 1,

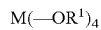

wherein M is Zr or Ti and $R^1$ comprises hydrocarbyl ligands, which may optionally contain one or more heteroatoms comprising oxygen, nitrogen, sulfur or phosphorus, with the proviso that two or more of $R^1$ may combine to form a cylic ring structure. Preferably M is Ti. Preferably, $R^1$ is independently in each occurrence alkylcarboxyl, alkenylcarboxyl, aryl or aralkylsulfonyl, phosphato-alkyl, pyrophosphato-alkyl or two or more of $R^1$ may combine to form an alkylene or carboxyl alkylene containing ring. In one preferred embodiment, $R^1$ comprises an alkylcarboxyl or alkenylcarboxyl moiety corresponding to the formula

wherein $R^2$ is an alkyl or alkenyl moiety.

In the embodiment wherein $R^1$ is alkyl, aryl or alkarylsulfonyl, $R^1$ preferably corresponds to the formula

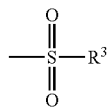

wherein $R^3$ is alkyl, aryl or alkaryl.

In the embodiment wherein $R^1$ is phosphato or pyrophosphato, $R^1$ preferably corresponds to the formula

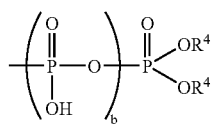

wherein $R^4$ is alkyl and b is 0 or 1.

In one preferred embodiment, at least one of $R^1$ is alkyl, more preferably $C_{1-8}$ alkyl, and most preferably isopropyl. Preferably, two or three of the ligands contain heteroatoms and most preferably three of the ligands contain heteroatoms. Preferably, $R^2$ is $C_{2-7}$ alkyl and more preferably $C_{3-8}$ alkyl. Preferably, $R^3$ is $C_{2-17}$ alkaryl and more preferably $C_{3-12}$ alkaryl. Preferably, $R^4$ is $C_{2-17}$ alkyl, more preferably $C_{2-8}$ alkyl and most preferably octyl. Preferably, a is a rational number of about 0 to about 3 and more preferably about 1 to about 2.

Among preferred titanate compounds are isopropyl tri(dioctyl)pyrophosphato titanate available under the code KR-38S from Kenrich Chemicals, isopropyltri(dodecyl)benzene sulfonyl titanate available from Kenrich Chemicals under the designation KR-9S, and di(octyl)pyrophosphate oxoethylene titanate available from Kenrich Chemicals under the designation KR-138S. Preferred zirconates include neopentyl((diallyl)oxy, tridodecyl)benzene-sulfonyl zirconate available from Kenrich Chemicals under the designation, NZ09, neopentyl (diallyl)oxy, tri(dioctyl) phosphate zirconate available from Kenrich Chemicals under the designation NZ12 and neopentyl (diallyl)oxy, tri(dioctyl)pyro-phspahto zirconate available from Kenrich Chemicals under the designation NZ38.

The titanate and/or zircoanate is present in the clear primer composition in sufficient amount to enhance the durability of the bond between the isocyanate functional adhesive and the glass. Preferably, the titanate and or zirconate is present in the clear primer composition including the solvent in an amount of about 2 weight percent based on the total weight of the composition or greater, more preferably about 4 weight percent or greater and most preferably about 5 weight percent or greater. Preferably, the titanate and/or zirconate is present in an amount of about 15 weight percent or less based on the weight of the composition, more preferably about 14 weight percent or less and most preferably about 12 weight percent or less. Preferably, the titanate is present in the clear primer composition excluding the solvent, solids only, in an amount of about 20 weight percent based on the total weight of the solids of the composition or greater, more preferably about 35 weight percent or greater, more preferably about 50 weight percent or greater and most preferably about 55 weight percent or greater. Preferably, the titanate is present in the solids in an amount of about 85 weight percent or less based on the weight of the composition, more preferably about 80 weight percent or less and most preferably about 75 weight percent or less.

In order to facilitate a durable bond between the isocyanate functional adhesive and the glass surface, one or more alkoxysilane compounds are utilized. Any alkoxysilane which enhances the bond of an adhesive to the surface may be used. Preferred silanes are those which do not have a functional group which forms a salt with an acidic compound. Also preferred are alkoxysilanes which react with isocyanate moieties. Among preferred alkoxysilanes are mercaptosilanes, isocyanato silanes, epoxy silanes, acrylic silanes and vinyl silanes. Preferred alkoxysilanes are trialkoxysilanes with trimethoxy silanes being most preferred. The most preferred class of alkoxysilanes are mercaptosilanes. "Mercaptosilanes" as used herein refer to any molecule having both a mercapto and a silane group which enhances the adhesion of an isocyanate functional adhesive to a glass surface. Preferably, mercaptosilanes are mercaptosilane alkyl di- or trialkoxysilanes. Preferably, mercaptosilanes correspond to the following formula

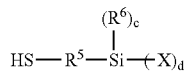

wherein $R^5$ is an hydrocarbylene group and $R^6$ is independently in each occurrence an alkyl group having 1 to 20 carbon atoms, an aryl group having 6 to 20 carbon atoms, an aralkyl group having 7 to 20 carbon atoms or a triorganosiloxy group represented by $(R^7)_3SIO—$, wherein each of the three $R^7$ groups, which may be the same or different represents a monovalent hydrocarbon group having 1 to 20 carbon atoms; X is independently in each occurrence a hydroxyl group or a hydrolyzable group; d is independently in each occurrence 0, 1, 2 or 3; and c is independently in each occurrence 0, 1 or 2. The sum of c and d is 3.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercaptosilane group, and an alkenyloxy group. Preferred among them are a hydrogen atom, an alkoxy group, an acyloxy group, a ketoximate group, an amino group, an amido group, an amino-oxy group, a mercaptosilane group, and an alkenyloxy group. An alkoxy group is more preferred with a methoxy or ethoxy group being most preferred, for ease in handling due to its mild hydrolyzability. Where two or more hydroxyl groups or hydrolyzable groups are present per reactive silicon group, they may be the same or different. $R^6$ is preferably an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R^7)_3Si—$ in which $R^7$ is methyl or phenyl.

$R^6$ and $R^7$ are most preferably a methyl group. $R^5$ is preferably an alkylene, arylene or alkarylene group and more preferably a $C_{2-8}$ alkylene group, even more preferably a $C_{2-4}$ alkylene group and most preferably $C_{2-3}$ alkylene group. Among preferred mercaptosilanes are mercaptosilane propyl trimethoxysilane and mercaptosilane propyl methyl dimethoxy silane.

The alkoxysilane is present in sufficient amount to enhance the bonding of the isocyanate functional adhesive to the substrate, or glass or coated plastic surface. Preferably, the amount of alkoxysilane present in the clear primer composition, including solvent, is about 0.1 percent by weight or more of the composition, more preferably about 1.0 percent by weight or more and most preferably about 2.0 percent by weight or more. Preferably, the amount of alkoxysilane present in the clear primer composition, including solvent, is about 20 percent by weight or less of the composition, more preferably about 15 percent by weight or less of the composition and most preferably about 13 percent by weight or less of the composition. Preferably, the alkoxysilane is present in the clear primer composition excluding the solvent, solids only, in an amount of about 10 weight percent based on the total weight of the solids of the composition or greater, more preferably about 15 weight percent or greater, and most preferably about 20 weight percent or greater. Preferably, the alkoxysilane is present in the clear primer composition in the absence of a solvent, solids only, in amount of about 85 weight percent or less based on the weight of the composition, more preferably about 80 weight percent or less and most preferably about 78 weight percent or less.

The clear primer composition may further comprise a strong organic acid to enhance the adhesion of an isocyante functional adhesive to a coated surface. Preferably the organic acid demonstrates a pKa of about 6 or less, more preferably about 4 or less. Preferred organic acids are carboxylic acids, sulfonic acids or phosphoric acids. More preferred organic acids are sulfonic or phosphonic acids. The most preferred class of acids are sulfonic acids. Examples of preferred sulfonic acids include aromatic acids such as para-toluene sulfonic acid and naphthalene sulfonic acid and alkyl sulfonic acids such as methane sulfonic, propane sulfonic and dodecyl benzyl sulfonic acid. More preferred classes of phosphoric acids include diphenyl phosphate, butyl acid phosphate, see list in U.S. Pat. No. 6,649,016 and those disclosed in U.S. Pat. No. 6,649,016 at column 9, line 11 to line 35, incorporated herein by reference.

Preferably, the amount of strong organic acid present in the clear primer composition, including solvent, is about 0.05 percent by weight or more of the composition, more preferably about 0.1 percent by weight or more and most preferably about 0.15 percent by weight or more. Preferably, the amount of strong organic acid present in the clear primer composition, including solvent, is about 2 percent by weight or less of the composition, more preferably about 1 percent by weight or less of the composition and most preferably about 0.6 percent by weight or less of the composition. Preferably, the strong organic acid is present in the clear primer composition excluding the solvent, solids only, in an amount of about 0.20 weight percent based on the total weight of the solids of the composition or greater, more preferably about 0.40 weight percent or greater, and most preferably about 0.50 weight percent or greater. Preferably, the strong organic acid is present in the composition in the absence of a solvent, solids only, in amount of about 12 weight percent or less based on the weight of the composition, more preferably about 10 weight percent or less and most preferably about 9 weight percent or less.

The clear primer also preferably contains a high molecular weight resin. The high molecular weight resins are present for the purpose of forming a film which provides strength to the primer and/or protects the glass or coated plastic surface from environmental attack. Any high molecular weight resin which forms a film upon evaporation of the solvent which may be used. The high molecular weight resin can have functional groups which react into the adhesive system or which react with the surface of the coating on the substrate. Alternatively, reactive functional groups are not required for the high molecular weight resin to work in the clear primer formulations. Examples of useful functional groups are hydroxyl, carboxyl, isocyanato, alkoxysilane, mercaptosilane, epoxy functional groups; mixtures thereof and the like. Preferred functional groups are hydroxyl, carboxyl, isocyanato, alkoxysilane, isocyanato and mixtures thereof. More preferred functional groups are isocyanato and alkoxysilane. Preferred alkoxysilanes are di- or tri-methoxy silanes. Preferred classes of resins are acrylics, isocyanate functional prepolymers, alkoxysilane resins, polyesters and the like. Preferred classes of resins are acrylics, isocyanate functional prepolymers and alkoxysilane based resins. More preferred resins are VESTOPLAST™ 206 silanated amorphous polyolefins available from Degussa, SAX™ 400 and SAT™ 200 silyl functional polypropylene oxide based polymers available from Kaneka and silane terminated polyurethanes. The resins preferably have a molecular weight which facilitates the formation of a strong film upon evaporation of the solvent. Preferably the high molecular weight resins have an weight average molecular weight of about 5,000 or greater, more preferably about 10,000 or greater and most preferably about 15,000 or greater. Preferably the high molecular weight resins have a weight average molecular weight of about 200,000 or less, more preferably about 150,000 or less and most preferably about 100,000 or less.

The clear primer composition of the invention further comprises a solvent. Solvents which are relatively inert towards the components of the composition and which volatilize rapidly after application of the composition to the surface of a substrate are preferably used. It is desirable that the solvent volatilize away from the surface of a substrate in sufficient time to allow application of the adhesive within the normal time constraints of assembly or fabrication under commercial conditions. For example, in the circumstances where a window is being installed in a vehicle on an assembly line, it is desirable that the solvent volatilize away before the application of adhesive and within the time period allotted for installation of the window into the vehicle without holding up the assembly line. Preferably, the substrate surface is dry before the adhesive is applied, that is, the solvent has volatilized away, in about 30 seconds or less, more preferably 20 seconds or less and most preferably 10 seconds or less. Preferable solvents include aromatic hydrocarbons, aliphatic hydrocarbons and low molecular weight alcohols and glycols. Low molecular weight alcohols and glycols preferably contain between about 1 and about 3 carbon atoms. Preferably, the aliphatic hydrocarbons have from about 4 to about 10 carbon atoms and more preferably from about 6 to about 9 carbon atoms and most preferably from about 7 to about 8 carbon atoms. Among preferred aliphatic hydrocarbons are hexane, 2,3-dimethylbutane, 2 methylbutane, 3-methylpentane, heptane, 2-methylhexane, 3-methylhexane, 2,3-dimethylpentane, 2,2-dimethylpentane, and 2,4-dimethylpentane. Preferably, the aromatic hydrocarbons contain about 6 to about 8 carbon atoms. Preferred aromatic hydrocarbons include toluene and xylene. Preferred alcohols and glycols include methanol, ethanol, n-propyl alcohol, isopropyl alcohol, n-butyl alcohol and isobutyl alcohol. Among preferred solvents are toluene, xylene and heptane. The most preferred solvent is toluene. The solvent is present in sufficient amount to dissolve the components of the composition and not so much as to lengthen the drying time of the solvent after application to the substrate surface. Preferably, the solvent is present in an amount based on the total weight of the clear primer composition of about 63 weight percent by weight or greater, preferably 75 weight percent or greater, even more preferably about 80 weight percent or greater and most preferably about 82 weight percent or greater. Preferably, the solvent is present in an amount based on the total weight of the clear primer composition of about 99 percent by weight or less, more preferably about 95 percent by weight or less and most preferably about 92 percent by weight or less.

The clear primer may further contain a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the primer must be sufficient so that the area of the window treated with the primer is apparent when the window is illuminated with an ultraviolet light.

As used herein, the term "durable bond" refers to the bond of the adhesive to the substrate surface wherein the bond lasts for a significant portion of the life, or the entire life, of the structure. The durability of a bond is typically predicted utilizing accelerated aging tests. For purposes of this invention, the following accelerated aging tests will be used as a predictor for durability of a bond. The clear primers are applied by saturating a cheesecloth with the solution and applying a thin wet coating to the window surface. Twenty seconds after the application, the adhesive is applied in a bead of 8 to about 10 mm in width and about 6 to about 8 mm in thickness down the length of the substrate. The adhesive is allowed to cure for 7 days at 23° C. and 50 percent Relative Humidity, then the sample is placed into a water bath and held at 90° C. After the indicated times the sample is removed from the water bath, allowed to rest at least 15 minutes, and then tested. The adhesive/substrate interface is scored with a sharp knife as the adhesive is being pulled back. The results are listed as the percent of cohesive failure (failure within the urethane adhesive) with the desired result being 100 percent CF (cohesive failure). The long-term durability is expressed as the number of days required to lose 100 percent CF. As used herein, a durable bond means that the adhesive under the above-mentioned test exhibits a performance of about 5 days or greater, more preferably about 6 days or greater and most preferably about 8 days or greater.

The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions, incorporated herein by reference.

The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in polyurethane adhesive compositions. In a preferred embodiment the prepolymers are blended with a compound or polymer having silane functionality. In another preferred embodiment the prepolymer contains silane functionality as well as isocyanate functionality. A urethane prepolymer having silane functionality may be used as the entire prepolymer used in the adhesive or it may be blended with a prepolymer which does not have silane functionality.

Preferable urethane prepolymers for use in preparing the composition of the invention include any compound having an average isocyanate functionality of at least about 2.0 and a molecular weight of at least about 2,000. Preferably, the average isocyanate functionality of the prepolymer is at least about 2.2, and is more preferably at least about 2.4. Preferably the isocyanate functionality is no greater than about 4.0, more preferably no greater than about 3.5 and most preferably no greater than about 3.0. Preferably, the weight average molecular weight of the prepolymer is at least about 2,500, and is more preferably at least about 3,000; and is preferably no greater than about 40,000, even more preferably no greater than about 20,000, more preferably, no greater than about 15,000 and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer. See Hsieh et al., U.S. Pat. No. 5,852,137, column 4, line 65 to column 5, line 7, incorporated herein by reference. Suitable polyisocyanates for use in preparing the prepolymer are disclosed in Hsieh et al., U.S. Pat. No. 5,852,137 at column 2, line 40 to column 3, line 45, incorporated herein by reference. The isocyanate content in the prepolymers is preferably in the range of about 0.1 percent to about 10 percent, more preferably in the range of about 1.0 percent to about 5.0 percent and most preferably in the range of about 1.5 percent to about 3.0 percent.

The prepolymer is present in the adhesive composition in sufficient amount such that the adhesive is capable of bonding glass or coated plastic to the desired substrate such as metal, plastic, fiberglass or composites. Preferably the polyurethane prepolymer is present in an amount of about 20 percent by weight or greater based on the weight of the adhesive composition, more preferably about 30 percent by weight or greater and most preferably about 40 percent by weight or greater. Preferably the polyurethane prepolymer is present in an amount of about 99.8 percent by weight or less based on the weight of the adhesive composition, more preferably about 98 percent by weight or less and most preferably about 85 percent by weight or less.

In those embodiments where the adhesive is used to bond glass or coated plastic to substrates coated with acid resistant paints it is desirable to have a silane present in some form. Preferable methods of including silane functionality in the adhesive formulations are disclosed in Wu et al. U.S. Pat. No. 6,512,033 at column 5 line 38 to column 7, line 27; U.S. Pat. No. 5,623,044; U.S. Pat. No. 4,374,237; U.S. Pat. No. 4,345,053 and U.S. Pat. No. 4,625,012, relevant portions incorporated herein by reference. The amount of silane present is that amount which enhances the adhesion of the adhesive to the painted surface. The amount of silane present is preferably about 0.1 percent by weight or greater based on the weight of the adhesive and most preferably about 0.5 percent by weight or greater. The amount of silane used is preferably about 10 percent by weight or greater or less and most preferably about 2.0 percent by weight or less.

The adhesive also contains a catalyst which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^9OC(O))_2$—Sn—$(R^9)_2$ wherein $R^9$ is independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo tin catalyst is present in an amount of about 60 parts per million or greater based on the weight of the adhesive more preferably 120 parts by million or greater. The organo tin catalyst is present in an amount of about 1.0 percent or less based on the weight of the adhesive, more preferably 0.5 percent by weight or less and most preferably 0.1 percent by weight or less.

Other useful catalysts include tertiary amines such as, dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, and mixtures thereof; and a metal alkanoates, such as bismuth octoate or bismuth neodecanoate and the like. A preferred dimorpholinodialkyl ether is dimorpholinodiethyl ether. A preferred di((dialkylmorpholino)alkyl)ether is (di-(2-(3,5-dimethylmorpholino)ethyl)ether). A tertiary amine, such as dimorpholinodialkyl ether or di((dialkylmorpholino)alkyl) ether, are preferably employed in an amount, based on the weight of the adhesive, of about 0.01 percent by weight or greater based on the adhesive, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The clear primer composition or adhesive composition may further comprise a stabilizing amount of an organophosphite. The organophosphite is preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Preferably at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structure; i.e. alkaryl. Ligand as used in this context refers to the groups bound to the oxygens bound to the phosphorous atoms of the phosphite. In a preferred embodiment the phosphite corresponds to the formula

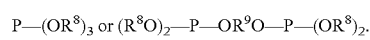

Preferably $R^8$ is independently in each occurrence $C_{6-18}$ alkyl, $C_{7-30}$ alkaryl or $C_{6-20}$ aryl; more preferably $C_{6-12}$ alkyl and most preferably $C_{9-12}$ alkyl. Preferably $R^9$ is independently in each occurrence $C_{6-18}$ alkylene, $C_{7-30}$ alkarylene, or $C_{6-20}$ arylene; more preferably $C_{7-30}$ alkarylene, or $C_{6-20}$ arylene; even more preferably $C_{7-30}$ alkarylene and most preferably a divalent bisphenol structure, for instance 1,3 propylene diphenyl or methylene diphenyl. Preferably the divalent bisphenol is based on bisphenol A or bisphenol F. As used herein alkyl means saturated straight or branched carbon chain.

Among preferred organophosphites are poly(dipropyleneglycol) phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphite is present in the adhesive or clear primer in an amount of about 0.1 percent by weight or greater and more preferably about 0.2 percent by weight or greater. Preferably the organophosphite is present in the adhesive or clear primer in an amount of about 1.0 percent by weight or less and more preferably about 0.5 percent by weight or less.

In a preferred embodiment, the system, either the adhesive, clear primer or both, includes a light stabilizer. Any light stabilizer which facilitates the system maintaining durable bond to the substrate for a significant portion of the life of the structure to which it is bonded may be used. Preferred light stabilizers are hindered amine light stabilizers. Hindered amine light stabilizers generally comprise include those available from Ciba Geigy such as TINUVIN™ 144, n-butyl-(3,5-di-ter-butyl-4-hydroxybenzyl)bis-(1,2,2,6-pentamethyl-4-piperidinyl) malonate; TINUVIN™ 622, dimethyl succinate polymer with 4-hydroxy-2,2,6,6,-tetramethyl-1-piperidine ethanol; TINUVIN™ 77, bis(2,2,6,6,-tetramethyl-4-piperidinyl) sebacate; TINUVIN™ 123, bis-(1-octyloxy-2, 2,6,6, tetramethyl-4-piperidinyl) sebacate, TINUVIN™ 765, bis(1,2,2,6,6,-pentamethyl-4-piperidinyl) sebacate; CHIMASSORB™ 944 poly[[6-[1,1,3,3-tetramethyl-butyl) amino]-1,3,5-triazine-2,4-diyl][(2,2,6,6-tetramethyl-4-piperidinyl)imino]-1,6-hexanedyl[(2,2,6-tetramethyl-4-piperidinyl)imino]]) and available from Cytec CYASORB™ UV 500 1,5-dioxaspiro (5,5) undecane 3,3-dicarboxylic acid, bis(2,2,6,6,-tetramethyl-4-piperidinyl) ester; CYASORB™ UV 3581, 3-dodecyl-1-(2,2,6,6,-tetramethyl-4-piperidyl-pyrrolidin-2,5-dione) and CYASORB™ UV 3346, poly[(6-morpholino-s-triazine-2,4-diyl)[2,2,6,6-tetramethyl-4-piperidyl)imino]-hexamethylene [(2,2,6,6-tetramethyl-4-piperidyl) imino]]. More preferred hindered light amine stabilizers include TINUVIN™ 1,2,3 bis-(1-octyloxy-2,2,6, 6, tetramethyl-4-piperidinyl) sebacate and TINUVIN™ 765, bis(1,2,2,6,6,-pentamethyl-4-piperidinyl) sebacate. A sufficient amount of light stabilizer to enhance the bond durability to the substrate may be used. Preferably, the light stabilizer is used in amount of about 0.1 percent by weight or greater, based on the weight of the adhesive composition or clear primer, more preferably 0.2 percent by weight or greater and most preferably about 0.3 percent by weight or greater. Preferably, the amount of light stabilizer present is about 3 weight percent or less, based on the weight of the adhesive composition or clear primer, more preferably about 2 weight percent or less and most preferably about 1 weight percent or less.

In another preferred embodiment, the clear primer, adhesive composition or both used further comprises an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as TINUVIN™ P, 2-(2'-hydroxy-5'-methylphenyl)-benzotriazole; TINUVIN™ 326, 2-(5-chloro-2H-benzotriazol-2-yl)-6-(1,1-dimethylethyl)-4-methylphenol; TINUVIN™ 213 poly(oxy-1,2-ethanediyl), (α,(3-(3-(2H-benzotriazol-2-yl)-5-(1,1-dimethylethyl)-4-hydroxyphenyl)-1-oxopropyl)-ω-hydroxy; poly(oxy-1,2-ethyanediyl), (α,(3-(3-(AH-benzotriazol-2-yl)-5-(1,1-dimethylethyl)-4-hydroxyphenyl)-1-oxopropyl)-ω-(α,(3-(3-(2H-benzotriazol-2-yl)-5-(1,1-dimethylethyl)-4-hydroxyphenyl)-1-oxopropyl); TINUVIN™ 327, 2-(3,5-di-tert-butyl-2-hydroxyphenol)-5-chlorobenzotriazole; TINUVIN™ 571, 2-(2H-benzotriazol-2-yl)-6-dodecyl-4-methylphenol, branched and linear; TINUVN™ 328, 2-(2H-benzotriazol-2-yl)-4,6-bis(1,1-dimethylpropyl)phenol and from Cytec such as CYASORB™ UV-9, 2-hydroxy-4-methoxybenzophenone; CYASORB™ UV-24, 2,2'-dihydroxy-4-methoxybenzophenone; CYASORB™ UV-1164, -[4,6-bis (2,4-dimethylphenyl)-1,3,5-triazin-2-yl]-5-(octyloxy) phenol; CYASORB™ UV 2337, 2-(2'-hydroxy-3'-5'-di-t-amylphenyl)benzotriazole; CYASORB™ UV 2908, 3,5-di-t-butyl-4-hydroxybenzoic acid, hexadecyl ester; CYASORB™ UV-5337, 2-(2'-hydroxy-3',5'-di-t-butylphenyl)-5-chlorobenzotriazole; CYASORB™ UV-531, 2-hydroxy-4-n-octoxybenzophenone; and CYASORB™ UV-3638, 2,2-(1,4-phenylene)bis[4H-3,1-benzoxazin-4-one]. More preferred UV light absorbers include CYASORB™ UV-531 2-hydroxy-4-n-octoxybenzophenone and TINUVIN™ 571 2-(2H-benzotriazol-2-yl)-6-dodecyl-4-methylphenol, branched and linear.

Preferably, the UV light absorber is used in sufficient amount to enhance the durability of the bond of the adhesive to the substrate. Preferably, the UV absorber is used in an amount of about 0.1 percent by weight or greater, based on the weight of the adhesive composition or clear primer, more preferably about 0.2 weight percent or greater and most preferably about 0.3 weight percent or greater. Preferably, the UV light inhibitor is used in amount of about 3 percent by weight or less based on the weight of the adhesive composition or clear primer, more preferably about 2 percent by weight or less and most preferably about 1 percent by weight or less.

For formulating adhesive compositions, the one or more prepolymers and the silane containing compound, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative. The fillers are preferably present in an amount of about 15 percent by weight or greater based on the amount of the adhesive. The fillers are preferably present in an amount of about 70 percent by weight or less based on the adhesive, more preferably 60 percent by weight or less and even more preferably 50 percent by weight or less.

The adhesive composition also preferably contains one or more plasticizers or solvents to modify rheological properties to a desired consistency. Such materials are preferably free of water, inert to isocyanate groups, and compatible with the polymer. Such material may be added to the reaction mixtures for preparing the prepolymer or to the mixture for preparing the final adhesive composition, but is preferably added to the reaction mixtures for preparing the prepolymer, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired theological properties and disperse the components in the adhesive composition. Preferably the plasticizer is present in an amount of about 0 percent by weight or greater, based on the adhesive composition, more preferably about 5 percent by weight or greater and most preferably about 10 percent by weight or greater. The plasticizer is preferably present in an amount of about 45 percent by weight or less, based on the adhesive composition, more preferably about 40 percent by weight or less and most preferably about 20 parts by weight or less.

The adhesive composition of this invention may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture. Contact with atmospheric moisture could result in premature cross-linking of the polyurethane prepolymer-containing isocyanate groups.

The clear primer composition is prepared by contacting the components in solvent and mixing to form a clear solution.

In general, the method of bonding glass or coated plastic, such as a window, to a substrate comprises contacting the clear primer composition of the invention with the surface of the glass or coated plastic and allowing the solvent of the clear primer composition to volatilize away. Thereafter, a suitable adhesive is applied to the surface of the treated glass or coated plastic along the portion of the glass or coated plastic which is to be bonded to the structure. The adhesive is thereafter contacted with the second substrate such that the adhesive is disposed between the glass or coated plastic and the second substrate. The adhesive is allowed to cure to form a durable bond between the glass or coated plastic and the substrate. In some embodiments the glass or coated plastic has an opaque coating about the perimeter of the glass or coated plastic. This is commonly referred to as a frit. For glass the coating is an inorganic enamel. The clear primer improves the ability of the described adhesive systems to bond to such coatings.

The primer composition may be applied by any means well known in the art. It may be applied manually by brushing, rolling or applying a cloth containing the composition to the surface of a substrate to which the adhesive will be applied such that a sufficient amount of the primer composition is applied to the surface. Preferably, the clear primer composition is applied using a robot. Useful robots for this operation are for example is M710I, available from Fanuc Robotics America, of Rochester Hills, Mich. used with an automated primer dispense applicator supplied by Nordson Corporation, Amherst, Ohio. The primer is applied such that there is at least about 8 to about 15 seconds of dry time after priming. The adhesive is applied at least 20 seconds after application of the primer.

In some embodiments, the adhesive composition is applied to the glass or coated plastic shortly after application of the clear primer composition. The minimum time between application of the clear primer and application of the adhesive is that time necessary for the solvent from the clear primer to volatilize away. In some embodiments, the clear primer adhesive composition may be applied in a different location from the location of application of the clear primer, for instance in a different part of the plant or a different plant. Further, the plants can be many miles apart, for instance hundreds or thousands of miles apart. The adhesive composition may be applied at a time much later than the application of the clear primer. In some embodiments, the time between application of the clear primer and the adhesive composition can be about 5 days or greater or even 30 days or greater. The time period between application of the clear primer and the adhesive composition can be about 90 days or less and preferably 60 days or less.

One process for applying a primer to a window comprises the steps of: (a) directing light onto the window to illuminate a portion of the window; (b) applying a clear primer along the illuminated portion of the window. If the clear primer contains a component that evaporates, then the process can further include the step of forming an infrared image of the window as the component evaporates to indicate the area of application of the clear primer. If the clear primer contains a component that fluoresces when illuminated by ultraviolet light, then the process can further include the step of illuminating the window with ultraviolet light to indicate the area of application of the clear primer. These processes may be performed as disclosed in commonly assigned U.S. Patent Publication 2003/0232152A1 and PCT Application WO 2003/106579 filed Jun. 11, 2003, incorporated herein by reference (WO 03/19745).

The system of the invention is used to bond porous and nonporous substrates together. The adhesive composition is applied to a substrate and the adhesive on the first substrate is thereafter contacted with a second substrate. Thereafter the adhesive is exposed to curing conditions. In a preferred embodiment one substrate is glass or plastic coated with an abrasion resistant coating and the other substrate is a plastic, metal, fiberglass or composite substrate which may optionally be painted. This method is especially effective for substrates painted with an acid resistant paint. Generally the primers and adhesives are applied at ambient temperature in the presence of atmospheric moisture. Exposure to atmospheric moisture is sufficient to result in curing of the adhesive. Curing may be further accelerated by applying heat to the curing adhesive by means of convection heat, or microwave heating. The system of the invention can be used to bond glass or plastic coated with an abrasion resistant coating, to other substrates such as metal or plastics. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In reference to polyurethane prepolymers, average isocyanate functionality and molecular weight are determined according to Wu, U.S. Pat. No. 6,512,033 at column 11 lines 3 to 29 and Bhat, U.S. Pat. No. 5,922,809 at column 12, lines 65 to column 13, line 26, incorporated herein by reference.

Molecular weights as described herein are determined according to the following to the procedure disclosed in Bhat, U.S. Pat. No. 5,922,809 at column 12, lines 50 to 64, incorporated herein by reference.

SPECIFIC EMBODIMENTS OF INVENTION

The following examples are included for illustrative purposes only and are not intended to limit the scope of the invention. Unless otherwise stated, all parts and percentages are by weight.

Preparation of Clear Primers

The formulations are listed as either parts of the solution or as a percent based upon solids and are prepared by simply mixing the appropriate amounts of the desired material. The primer is prepared by adding a solvent to a pre-dried glass bottle. The silane is added to the bottle and the bottle shaken for 2 minutes on a shaker. Finally, the titanate is added and the whole mixture is shaken for 3 minutes.

The adhesion experiments were performed on three ceramic enamels on the surface of a glass coupon. Two of these, a bismuth and zinc containing frit (Frit 1) and bismuth and zinc containing frit further containing lithium and sulfur (Frit 2) are used on press-bent glass. The third was a bismuth and zinc containing frit (Frit 3), which is used on sag-bent glass. Each of these three ceramic enamels is available from the Ferro Corporation. All glass coupons were used as received without any additional cleaning or pretreatment other than the application of the indicated clear wipe.

The clear primer compositions were applied by saturating a cheesecloth with the solution and applying a thin wet coating to the ceramic enamel surface. Twenty seconds after the application of the clear primer, the adhesive was applied in a bead of about 8 to about 10 mm width and about 6 to about 8 mm thickness down the length of the substrate. The adhesive is allowed to cure for 7 days at 23° C. and 50 percent RH before testing. The adhesion test is a modified peel test called the Quick Knife Adhesion (QKA) test. In this test the adhesive/substrate interface is scored with a sharp knife as the adhesive is being pulled back. The results are listed as the percent of cohesive failure (failure within the urethane adhesive) with the desired result being 100 percent CF (cohesive failure). The alternative failure mode is adhesive failure which is failure of the bond of the adhesive to the surface of the substrate. In addition to the initial adhesion results, additional samples were run through a durability experiment. After preparing the samples and curing for seven days as described above, the samples were placed into a water bath and held at 90° C. After the indicated times a sample was removed from the water bath, allowed to rest at least 15 minutes, and then tested via the QKA test. The long-term durability is expressed as the number of days required to lose 100 percent CF, i.e., demonstrates some adhesive failure.

Adhesive 1 is an adhesive formulated with a silane grafted isocyanate terminated prepolymer, plasticizer, carbon black, 2,2-dimorpholinodiethylether dimethyltin carboxylate, and a phosphite antioxidant.

Table 1 is a screen on the type of resin that may be used in formulations of the invention. Five film forming resins were evaluated. The initial adhesion for all 7 examples was 100 percent CF for each of the three enamels. The performance of the system in the 90° C. durability experiments was a function of the resin type. Example 1, made without a resin, had the worst overall durability and lost 100 percent CF on Frit 1 after 1 day of water exposure film forming. Film forming resins improved the durability with the best performance resulting when a silane containing resin was used (Examples 4-7).

TABLE 1

| Ingredients | Example 1 | Example 2 | Example 3 | Example 4 | Example 5 | Example 6 | Example 7 |
|---|---|---|---|---|---|---|---|
| Toluene | 91.00% | 90.40% | 90.40% | 90.25% | 85.40% | 82.85% | 82.95% |
| SILQUEST ™ A-189 | 3.75% | 3.75% | 3.75% | 3.75% | 3.75% | 3.75% | 3.75% |
| PARALOID ™ AU-1166 | | 0.60% | | | | | |
| PARALOID ™ AT-81 | | | 0.60% | | | | |
| VESTOPLAST ™ 206 | | | | 0.75% | 0.75% | | |
| SAX ™ 400 | | | | | | 3.30% | |
| SAT ™ 200 | | | | | | | 3.20% |
| DDBSA | 0.25% | 0.25% | 0.25% | 0.25% | 0.10% | 0.10% | 0.10% |
| KR-9S | 5.0% | 5.0% | 5.0% | 5.0% | 10.0% | 10.0% | 10.0% |
| Total | 100.00% | 100.00% | 100.00% | 100.00% | 100.00% | 100.00% | 100.00% |

| | Example 1 | Example 2 | Example 3 | Example 4 | Example 5 | Example | Example 7 |
|---|---|---|---|---|---|---|---|
| Initial Adhesion Test | | | | | | | |
| Frit 1 | 100% CF | 100% CF | 100% CF | 100% CF | 100% CF | 100% CF | 100% CF |
| Frit 3 | 100% CF | 100% CF | 100% CF | 100% CF | 100% CF | 100% CF | 100% CF |
| Frit 2 | 100% CF | 100% CF | 100% CF | 100% Cf | 100% CF | 100% CF | 100% CF |
| Accelerated durability test Day in 90° C. Water | | | | | | | |
| Frit 1 (Days) | 1 | 6 | 5 | 3 | 5 | 7 | 8 |
| Frit 3 (Days) | 5 | 6 | 6 | 5 | 6 | 10 | 10 |
| Frit 2 (Days) | 4 | 4 | 4 | 5 | 6 | 10 | 7 |

SILQUEST™ A-189 is gamma-mercaptopropyltrimethoxysilane.

PARALOID™ AV-1166 is an acrylic polyol resin.

PARALOID™ AT-81 is an acrylic resin with carboxyl functional groups. VESTOPLAST™ 206 is a silanated amorphous polyolefin. SAX™ 400 is a silyl functional polypropylene oxide based polymer. SAT™ 200 is a silyl functional polypropylene oxide based polymer. DDBSA is dodecylbenzyl sulfonic acid and KR9S is isopropyltri(dodecyl)benzene sulfonyl titanate.

Table 2 illustrates the range of titanates and zirconates that can be used in the formulation of the invention. Formulations 8-10 and 13-15 contain titanate and zirconate compounds with both dodecyl benzene sulfonic acid ligands (KR-09S and NZ09) and phosphate ligands (KR12, KR38, NZ12 and NZ38). The level of performance varied on the material used with the best performance resulting with the sulfonic acid ligands. Example 12 is a formulation where the ligand is a carboxylic acid ligand. Its initial performance is poor and it was not tested in the durability experiments.

TABLE 2

| Ingredients | pH | Example 8 | Example 9 | Example 10 | Example 11 | Example 12 | Example 13 | Example 14 | Example 15 | Example 16 |
|---|---|---|---|---|---|---|---|---|---|---|
| Toluene | | 85.35% | 85.35% | 83.35% | 86.85% | 90.10% | 83.55% | 83.65% | 81.45% | 83.92% |
| SILQUEST ™ A-189 | | 3.75% | 3.75% | 3.75% | 3.75% | 3.75% | 3.75% | 3.75% | 3.75% | 3.75% |
| VESTO-PLAST ™ 206 | | 0.75% | 0.75% | 0.75% | 0.75% | 1.00% | 0.75% | 0.75% | 0.75% | 0.75% |
| DDBSA | | 0.15% | 0.15% | 0.15% | 0.15% | 0.15% | 0.15% | 0.15% | 0.15% | 0.15% |
| KR-9S | 2.0 | 10.00% | | | | | | | | |
| KR 12 | 4.5 | | 10.00% | | | | | | | |
| KR-38S | 2.0 | | | 12.00% | | | | | | |
| KR-138S | 3.0 | | | | 8.50% | | | | | |
| KR TTS | 5.5 | | | | | 5.00% | | | | |
| NZ 09 | 4.0 | | | | | | | | | |
| NZ 12 | 6.0 | | | | | | | 11.7% | | |
| NZ 38 | 6.0 | | | | | | | | 13.9% | |
| Lica 09 | 2.0 | | | | | | | | | 11.4% |
| Total | | 100.00% | 100.00% | 100.00% | 100.00% | 100.00% | 100.00% | 100.00% | 100.00% | 100.00% |

| | Example 8 | Example 9 | Example 10 | Example 11 | Example 12 | Example 13 | Example 14 | Example 15 | Example 16 |
|---|---|---|---|---|---|---|---|---|---|
| Initial Adhesion Test | | | | | | | | | |
| Frit 1 | 100% CF | 0% CF | 100% CF | 100% CF | 0% CF | 100% CF | 50% CF | 50% CF | 100% CF |
| Frit 3 | 100% CF | 100% CF | 100% CF | 100% CF | 0% CF | 100% CF | 100% CF | 100% CF | 100% CF |
| Frit 2 | 100% CF | 0% CF | 100% CF | 100% Cf | 0% CF | 100% CF | 50% CF | 100% CF | 100% CF |
| Accelerated durability test Day in 90° C. water | | | | | | | | | |
| Frit 1 | 6 | 0 | 2 | 2 | NA | 5 | <4 | <2 | 6 |
| Frit 3 | 7 | 5 | 3 | 5 | NA | 5 | 5 | 5 | 8 |
| Frit 2 | 5 | 0 | <2 | <2 | NA | 4 | 4 | <2 | 6 |

KR 12 is isopropyl tri(dioctyl) phosphate titanate.

KR38S is isopropyl tri(dioctyl)pyrophosphato titanate.

KR 138S is di(dioctyl)pyrophosphate or ethylene titanate.

KRTTS is isopropyl tri(isostearol) titanate.

NZ09 is neopentyl (diallyl)oxy tri(dodecyl)benzene sulfonyl zirconate.

NZ 12 is neopentyl (diallyl) oxy, tri (dioctyl)phosphate zirconate.

NZ 38 is neopentyl(diallyl)oxy, tri (dioctyl)pyrophosphato-zirconate.

LICA 09 is neopentyl(diallyl)oxy, tri(dodecyl)benzene-sulfonyl titanate.

Table 3 shows the results of experiments wherein the formulation of Example 8 was used to study the effects of changing the acidic compound. In Examples 16-22 in Table 3, different sulfonic and phosphoric acid compounds were used. All had some level of initial adhesion. The durability was comparable between the formulations, and the sulfonic acid materials retained 100 percent CF for longer times than the phosphoric acid materials.

TABLE 3

| Ingredients | Example 17 | Example 18 | Example 19 | Example 20 |
|---|---|---|---|---|
| Toluene | 85.35% | 84.44% | 85.35% | 85.35% |
| SILQUEST A-189 | 3.75% | 3.75% | 3.75% | 3.75% |
| VESTOPLAST ™ 206 | 0.75% | 0.75% | 0.75% | 0.75% |
| KR-9S | 10.00% | 10.00% | 10.00% | 10.00% |
| DDBSA | 0.15% | | | |
| DNNSA (50% in heptane) | | 1.06% | | |
| Diphenyl phosphate | | | 0.15% | |
| Butyl acid phosphate | | | | 0.15% |
| Total | 100.00% | 100.00% | 100.00% | 100.00% |

| | Example 8 | Example 17 | Example 18 | Example 19 |
|---|---|---|---|---|
| Initial Adhesion Test | | | | |
| Frit 1 | 100% CF | 100% CF | 100% CF | 100% CF |
| Frit 3 | 100% CF | 20% CF | 100% CF | 95% CF |
| Frit 2 | 100% CF | 100% CF | 100% CF | 100% Cf |
| Accelerated durability test Day in 90° C. water | | | | |
| Frit 1 | 7 | 6 | 8 | 2 |
| Frit 3 | 8 | 8 | 6 | <2 |
| Frit 2 | 5 | 4 | 5 | <2 |

DNNSA (50 percent in haptane) is dinonyl naphthalene sulfonic acid.

Table 4 illustrates the performance of formulations using only titanate, zirconate or sulfonic acids. All formulations showed 100 percent initial adhesion on three enamels. Examples 21-23 contain titanate (KR-9S, Lica 09) and zirconate (NZ09) compounds with dodecyl benzene sulfonic acid ligands but no acid compound. These formulations showed very good to acceptable 90° C. durability performance. Examples 24-25 contain large amounts of SILQUEST™ A-189 and VESTOPLAST™ 206. With only sulfonic acid as a catalyst, they showed acceptable 90° C. durability performance.

TABLE 4

| Ingredients | Example 21 | Example 22 | Example 23 | Example 24 | Example 25 |
|---|---|---|---|---|---|
| Toluene | 85.50% | 84.07% | 83.70% | 86.05% | 85.23% |
| Silquest A 189 | 3.75% | 3.75% | 3.75% | 11.25% | 11.25% |
| Vestoplast ® 206 | 0.75% | 0.75% | 0.75% | 2.25% | 2.25% |
| KR-9S | 10.00% | | | | |
| Lica 09 | | 11.43% | | | |
| NZ 09 | | | 11.80% | | |
| DDBSA | | | | 0.45% | |
| DNNSA (50% in heptane) | | | | | 1.27% |
| Total | 100.00% | 100.00% | 100.00% | 100.00% | 100.00% |

| | Example 20 | Example 21 | Example 22 | Example 23 | Example 24 |
|---|---|---|---|---|---|
| Frit 1 | 100% CF | 100% CF | 100% CF | 100% CF | 100% CF |
| Frit 3 | 100% CF | 100% CF | 100% CF | 100% CF | 100% CF |
| Frit 2 | 100% CF | 100% CF | 100% CF | 100Ccf | 100% CF |
| Accelerated durability test Day in 90° C. water | | | | | |
| Frit 1 | 6 | 8 | 5 | 5 | 4 |
| Frit 3 | 8 | 8 | <4 | 7 | 8 |
| Frit 2 | 6 | 6 | 5 | 8 | 6 |

What is claimed is:

1. A composition comprising:
   a) one or more strong organic acids; one or more organotitanates or organozirconates having four ligands wherein the ligands are hydrocarbyl, which hydrocarbyl ligands may contain one or more functional groups having one or more heteroatoms selected from the group comprising oxygen, nitrogen, phosphorus or sulfur wherein two or more of the hydrocarbyl ligands may form a cyclic structure with the proviso that one of the hydrocarbyl ligands has an acidic moiety or a mixture of one or more strong organic acids and one or more organotitanates or organozirconates;
   b) one or more alkoxysilanes; and
   c) one or more solvents which dissolve components a) and b) of the composition.

2. A composition according to claim 1 which further comprises a high molecular weight resin.

3. The composition according to claim 2 wherein the high molecular weight resin has alkoxysilane functionality, isocyanate functionality or both functionalities.

4. A composition according to claim 1 wherein one or more organotitanates or organozirconates and one or more strong acids are present.

5. A composition according to claim 4 which comprises:
   a) from about 2 to about 15 percent by weight of one or more organotitanates, organozirconates or a mixture thereof;
   b) from about 0.1 to about 10 percent by weight of one or more alkoxysilanes;
   c) from about 0.1 to about 10 percent by weight of one or more high molecular weight resins;
   d) from about 0.05 to about 2 percent by weight of one or more strong organic acids; and
   e) from about 63 to about 95 percent by weight of a solvent;
   wherein the weight percents stated are based on the weight of the total composition.

6. The composition according to claim 5 wherein the strong organic acid is a sulfonic acid, a phosphoric acid or a derivative thereof.

7. The composition according to claim 6 wherein the strong organic acid is a sulfonic acid.

8. The composition according to claim 7 wherein the alkoxysilane is a mercaptosilane.

9. A composition according to claim 1 wherein the ligands on the one or more organotitanates or organozirconates are hydrocarbyl, hydrocarbyl carboxyl, hydrocarbyl sulfonyl, phosphate hydrocarbyl, pyrophosphato hydrocarbyl, two or more ligands form a hydrocarbylene moiety, two or more ligands form a carboxyl containing hydrocarbylene moiety, or a combination thereof.

10. A composition according to claim 1 wherein the organo-titanates and organozirconates correspond to the formula $M(—OR^1)_4$ wherein M is Ti or Zr and $R^1$ is independently in each occurrence hydrocarbyl, hydrocarbyl carboxyl, hydrocarbyl sulfonyl, phosphato hydrocarbyl, pyrophosphato hydrocarbyl, with the proviso that two or more of $R^1$ may combine to form a cyclic ring structure.

11. A system for bonding glass to a substrate which comprises:
   i) a composition according to claim 1; and
   ii) an adhesive comprising an isocyanate functional prepolymer and a catalyst which catalyzes the reaction of isocyanate moieties with water or an active hydrogen containing compound.

12. A system according to claim 11 wherein the system further comprises an ultraviolet light stabilizer.

13. A system according to claim 11 wherein the system further comprises a hindered amine light stabilizer.

14. A system according to claim 11 wherein the system further comprises a stabilizing amount of an organophosphite which has an alkaryl ligand or both an aliphatic ligand and an aromatic ligand.

15. A system according to claim 11 wherein the system further comprises a stabilizing amount of an organophosphite which has an alkaryl ligand or both an aliphatic ligand and an aromatic ligand, an ultraviolet light stabilizer, and a hindered amine light stabilizer.

16. A system according to claim 11 wherein the composition of Part i) further comprises a high molecular weight resin.

17. A system according to claim 11 wherein one or more organotitanates or organozirconates and one or more strong acids are present in the composition of Part i).

* * * * *